US010096173B2

(12) United States Patent
Stenneth

(10) Patent No.: US 10,096,173 B2
(45) Date of Patent: Oct. 9, 2018

(54) PARKING PAYMENT DETECTION

(71) Applicant: HERE Global B.V., Eindhoven (NL)

(72) Inventor: Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 584 days.

(21) Appl. No.: 13/915,230

(22) Filed: Jun. 11, 2013

(65) Prior Publication Data

US 2014/0365283 A1 Dec. 11, 2014

(51) Int. Cl.
G07B 15/00 (2011.01)
G07B 15/02 (2011.01)
G06Q 30/02 (2012.01)

(52) U.S. Cl.
CPC ......... *G07B 15/02* (2013.01); *G06Q 30/0284* (2013.01)

(58) Field of Classification Search
CPC ............ G07B 15/012; G06Q 30/0284; G06Q 20/127; G06Q 30/04; G06Q 20/32
USPC .......................................................... 705/13
See application file for complete search history.

(56) References Cited

U.S. PATENT DOCUMENTS

| 3,376,547 | A | 4/1968 | Huber |
| 5,004,997 | A | 4/1991 | Shisgal et al. |
| 5,910,782 | A | 6/1999 | Schmitt et al. |
| 6,493,676 | B1 * | 12/2002 | Levy ................ G06Q 30/0284 705/13 |
| 8,111,172 | B2 | 2/2012 | Morimoto et al. |
| 9,064,416 | B1 * | 6/2015 | Foster .................... G08G 1/005 |
| 2002/0032601 | A1 * | 3/2002 | Admasu ................ G06Q 30/04 705/13 |
| 2002/0143611 | A1 * | 10/2002 | Odinak ................ G06Q 20/102 705/13 |
| 2003/0010821 | A1 * | 1/2003 | Silberberg ........... G06Q 20/127 235/382 |
| 2003/0146852 | A1 * | 8/2003 | O'Dell .................... G07B 15/02 340/932.2 |

(Continued)

FOREIGN PATENT DOCUMENTS

EP 1764746 3/2007
EP 0 781 437 B2 7/2007

(Continued)

OTHER PUBLICATIONS

Liu et al.,iParking: An Intelligent Indoor Location-Based Smartphone Parking Service, Oct. 31, 2012, Sensors 2012, pp. 14613-14627 (Year: 2012).*

*Primary Examiner* — Michael P Harrington
*Assistant Examiner* — Rupangini Singh
(74) *Attorney, Agent, or Firm* — Alston & Bird LLP

(57) ABSTRACT

In one embodiment, a mobile device (e.g., a smartphone) is utilized to determine whether a user has paid for parking. The mobile device collects sensor data that describes actions of a mobile device or actions of an automobile or of a driver of the automobile. The sensor data includes one or more of location data, acceleration data, rotational data, or audio data. Either the mobile device or a centralized server performs an analysis of the sensor data to determine data indicative of a pay status of the parking spot. The pay status indicates whether the user has likely paid for parking. The mobile device or the centralized server is configured to generate a message based on the data indicative of the pay status of the parking spot.

18 Claims, 8 Drawing Sheets

(56) References Cited

U.S. PATENT DOCUMENTS

| | | | |
|---|---|---|---|
| 2004/0059693 A1* | 3/2004 | Hausen | G07B 15/02 705/418 |
| 2007/0040701 A1* | 2/2007 | Browne | G08G 1/14 340/932.2 |
| 2008/0052254 A1* | 2/2008 | Al Amri | G06Q 30/0284 705/418 |
| 2008/0071611 A1* | 3/2008 | Lovett | G07B 15/063 705/13 |
| 2008/0270227 A1* | 10/2008 | Al Amri | G07B 15/02 705/13 |
| 2009/0171563 A1 | 7/2009 | Morimoto et al. | |
| 2010/0026522 A1* | 2/2010 | Ward, II | G06Q 20/127 340/932.2 |
| 2010/0109864 A1* | 5/2010 | Haartsen | G01C 21/206 340/539.13 |
| 2010/0274693 A1* | 10/2010 | Bause | G06Q 20/32 705/32 |
| 2010/0302068 A1 | 12/2010 | Bandukwala | |
| 2011/0131154 A1* | 6/2011 | Faber | G01C 21/32 705/418 |
| 2012/0130777 A1* | 5/2012 | Kaufman | G07B 15/02 705/13 |
| 2012/0296708 A1* | 11/2012 | Bachmann | G06Q 20/127 705/13 |
| 2013/0124270 A1* | 5/2013 | Tziperman | G07B 15/02 705/13 |
| 2014/0232569 A1* | 8/2014 | Skinder | G01C 21/16 340/989 |

FOREIGN PATENT DOCUMENTS

| | | |
|---|---|---|
| EP | 1895486 | 3/2008 |
| EP | 2267681 | 12/2010 |
| WO | WO 96/034366 A1 | 10/1996 |
| WO | WO9634366 | 10/1996 |
| WO | WO2012142603 | 10/2012 |

* cited by examiner

PARKING PAYMENT DETECTION

FIELD

The following disclosure relates to parking payment detection, or more particularly, mobile device tracking to detect payment for parking.

BACKGROUND

A parking meter is a device for collecting money in exchange for use of a parking spot in a particular area for a specific amount of time. Parking meters may be mechanical, electronic, or a combination. Mechanical parking meters include a coin slot to receive a coin and a dial that engages a mechanism that accepts the coin and signals that a parking fee has been paid and/or amount of time left on the parking fee. Electronic parking meters include an electronic circuit that display a readout of the remaining time based on payment received.

Each parking meter may be associated with an individual parking spot and installed near the individual parking spot. However, many cities have deployed multispace meters that control multiple spaces and are spaced several car lengths apart. The multispace meters may include multiple forms of payment, reducing the need for carrying coins for the meter. The multispace meters may also be built sturdier to resist vandalism. The multispace meters may communicate with a service provider to report errors or the need for maintenance. However, multispace meters place an additional burden to the customer. Because the multispace meters are spaced several car lengths apart, the customer must walk to the multispace meter and return to the vehicle to place the parking receipt in the windshield. Also, multispace meters may be hard to identify, and the customer may incorrectly assume no meter is present.

SUMMARY

In one embodiment, a mobile device (e.g., a smartphone) is utilized to determine whether a user has paid for parking. The mobile device collects sensor data that describes actions of a mobile device or actions of an automobile or of a driver of the automobile. The sensor data includes one or more of location data, acceleration data, rotational data, or audio data. Either the mobile device or a centralized server performs an analysis of the sensor data to determine data indicative of a pay status of the parking spot. The pay status indicates whether the user has likely paid for parking. The mobile device or the centralized server is configured to generate a message based on the data indicative of the pay status of the parking spot.

BRIEF DESCRIPTION OF THE DRAWINGS

Exemplary embodiments of the present invention are described herein with reference to the following drawings.

DETAILED DESCRIPTION

A parking console may be associated with a single parking space or multiple parking spaces. Some multispace parking consoles allow a customer to enter a number for the specific parking spot into the parking console. An administrator may check for payment by accessing the parking console in person or remotely. Other multispace parking consoles dispense a receipt that is placed in a window or dash of the parked car. The administrator may check for the presence of the receipt by visually inspecting the parked car. Many cities, transit authorities, or parking authorities deploy dozens or hundreds of employees to patrol the streets for missing or expired receipts in parked automobiles. The following embodiments complement or circumvent this otherwise tedious process to automatically detect payment of parking based on the behavior of the driver. In addition or in the alternative, the following embodiments remind drivers of parked cars to pay for parking when no payment of parking was detected.

The detection of the parking payment may be based on various alternative or complementary techniques. One technique involves tracking a position of a mobile device of the user in proximity to a parking console. Another technique involves detecting a speed of the mobile device to identify relative movement of the user associated with using the parking console. Another technique involves measuring rotational movement of the user associated with using the parking console. Another technique involves detecting sounds from the parking console associated with the parking payment. Combinations of these techniques may be used.

Figure 1:
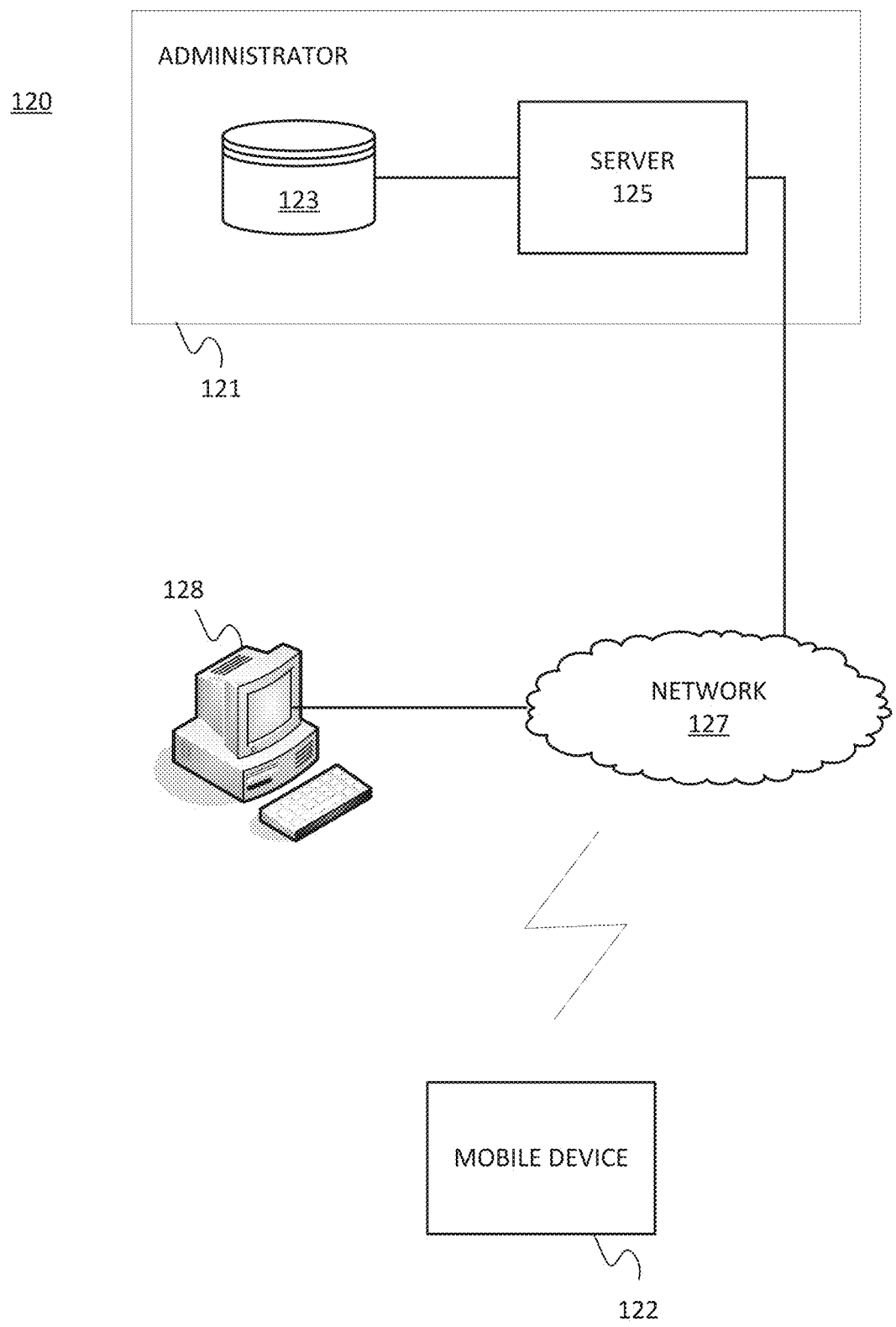
FIG. 1 illustrates an example system for parking payment detection.

FIG. 1 illustrates an example system 120 for parking payment detection. The system 120 includes an administrator system 121, a mobile device 122, a workstation 128, and a network 127. Additional, different, or fewer components may be provided. For example, many mobile devices 122 and/or workstations 128 connect with the network 127. The administrator system 121 includes a server 125 and a database 123. The administrator system 121 may include computer systems and networks of a system operator (e.g., HERE Maps, NAVTEQ or Nokia Corp.).

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors built or embedded into or within the interior of the mobile device 122.

The mobile device 122 generates sensor data that describes the behavior of a user or an automobile associated with the user. The mobile device 122 may be carried on the user (e.g., mobile phone) or installed in the automobile (e.g., navigation device). The sensor data may describe the position, speed, or acceleration of the automobile. The sensor data may describe the position, speed, acceleration, rotational speed, orientation, or another aspect of the mobile device 122. The sensor data is received at a controller of the mobile device 122 or the server 125 for processing.

A parking analysis of the sensor data may be performed to determine whether the automobile has stopped at a parking spot. The parking analysis may be based on the position of the automobile. For example, the position of the automobile may be compared to known locations of parking spots. The geographic coordinates of the parking spots may be individually recorded in the database 123. Alternatively, the locations of the parking spots may be inferred at locations adjacent to streets.

The parking analysis may be based on recent movement of the automobile. For example, when the automobile is stopped for a predetermined amount of time, the parking analysis determines that the automobile has parked. Alternatively, when the automobile moves in a pattern indicative of a parking sequence, the parking analysis determines that the automobile has parked. The parking sequence may include movements that resemble driving into a parking spot or parallel parking.

The mobile device 122 or the database 123 includes a lookup table that lists locations of parking payment consoles. The lookup table may include all or a sub-set of the parking payment consoles in a municipality or a geographic region. The lookup table may index the parking payment consoles by street address, estimated street address, and/or geographic coordinates. The lookup table may be also include an identification value for the parking payment console, the hours of operation for parking spots served by the parking payment console, the rate for parking spots served by the parking payment console, a zone identification value for the parking payment console, a time limit for parking, and/or hours of operation that payment is required.

The mobile device 122 or the server 125 may be configured to access an application programming interface (API) via a uniform resource locator (URL) to retrieve the locations of parking payment consoles. The mobile device 122 or the server 125 may query the API with geographic coordinates (e.g., latitude and longitude) and, optionally, a radius, and the API returns locations and related information (e.g., the hours of operation for parking spots served by the parking payment console, the rate for parking spots served by the parking payment console, a zone identification value for the parking payment console, a time limit for parking, and/or hours of operation that payment is required) for the parking payment consoles.

A pay status analysis of the sensor data may be performed to determine data indicative of a pay status of the parking spot. The pay status analysis may be initiated in response to the parking analysis determining that the automobile has parked. The pay status may describe whether the user has paid or likely has paid for the parking spot. The sensor data may describe the position, speed, or acceleration of the mobile device 122. The speed or acceleration may be derived from the position of the mobile device 122.

In one example, the pay status analysis is based only on the position of the mobile device 122. When the mobile device 122 is at any point within a predetermined distance from the parking payment console, the pay status analysis determines that the user has paid for parking. In another example, the pay status analysis is based on the position of the mobile device 122 and a dwell time of the mobile device 122. When the mobile device 122 comes within a predetermined distance to the parking payment console for a predetermined amount of time, the pay status analysis determines that the user has paid for parking. In another example, the pay status analysis is based on the position of the mobile device 122 and the acceleration of the mobile device 122. When the mobile device 122 comes within a predetermined distance to the parking payment console and the acceleration falls below a threshold value, the pay status analysis determines that the user has paid for parking. The threshold value may be zero acceleration or another near zero value.

The mobile device 122 is configured to display a message based on the data indicative of the parking status or the pay status of the parking spot. The message may be a user message. For example, the mobile device 122 may display a graphic or push notification that reminds the user to pay for parking. The message may state "Don't Forget to Pay for Parking." The message may state:

Did you just park near 410 N. Main St.?
Currently, payment is required for parking.
Please visit the payment console at 427 N. Main St. (across the street).

The message may be addressed to the administrator system 121. The message may indicate that a user may have parked without paying. The message may include a parking spot identification value, the payment console identification value, a street address, or geographic coordinates of the parking spot or mobile device 122. The administrator system 121 may dispatch an agent to investigate the pay status of the parked automobile.

The optional workstation 128 is a general purpose computer including programming specialized for the disclosed embodiments. For example, the workstation 128 may receive user inputs for defining the size of the radius around the console or other thresholds. The workstation 128 includes at least a memory, a processor, and a communication interface.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

Figure 2:
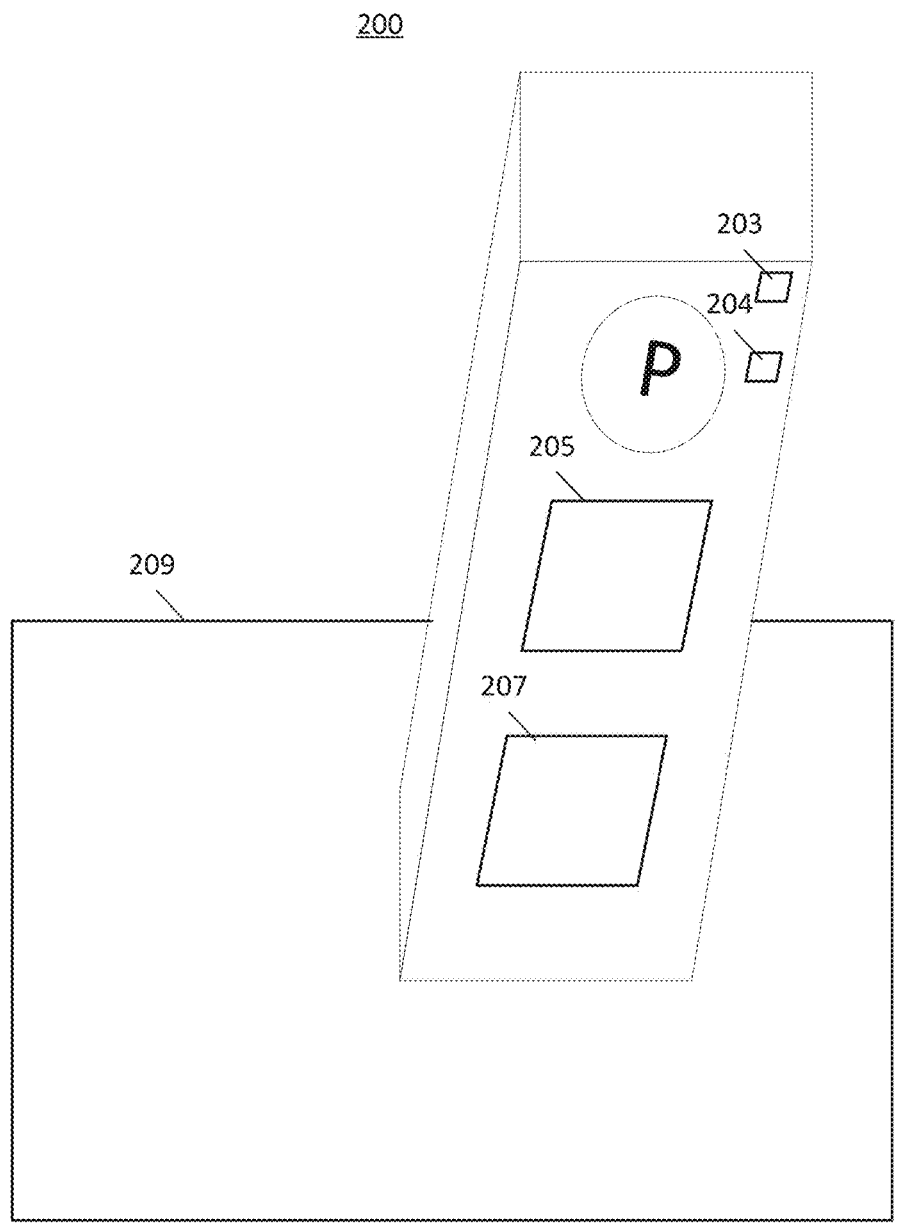
FIG. 2 illustrates an example parking payment console.

FIG. 2 illustrates an example parking payment console 200. The parking payment console 200 includes a payment portion 205 and an instruction portion 207. The parking payment console 200 may be installed on a ground surface 209 (e.g., sidewalk, pavement) or mounted on a wall, utility pole, or other object.

The payment portion 205 includes one or more of the following: a coin slot, a bill accepter, a credit card reader, a display, or a receipt printer. The bill accepter includes a scanner or charged coupled device (CCD) configured to read and identify various types of currency. The credit card reader may include a magnetic sensor configured to read the magnetic strip of credit cards. The receipt portion may include a printer configured to print a receipt. The receipt printer may be an ink jet printer or a thermal printer. The receipt may include an amount of payment, the associated amount of parking time, an expiration time, and/or the identification value for the parking payment console 200. The receipt may include an adhesive.

The instruction portion 207 may include a display screen or printed material. The instruction portion 207 may include directions for the user on how to use the parking payment console 200. The user may select an amount of parking time through the display screen or another input device.

The parking payment console 200 may be electronically isolated. The term electronically isolated means that the parking payment console 200 may be a standalone device that does not communicate with another device or network during use by parkers. Alternatively, the parking payment console 200 may include a communication portion 203. The communication portion 203 may be coupled to a network, such as the Internet or a cellular network, to communicate with the server 125. The parking payment console 200 may be powered by wired electricity, batteries, or solar power.

The communication portion 203 may be coupled with a positioning device 204. The positioning device 204 may be configured to detect the geographic position of the parking payment console 200. The positioning device 204 may include a Global Positioning System (GPS), Global Navigation Satellite System (GLONASS), or a cellular or similar position sensor for providing location data. The communication portion 203 may report location data including the geographic position of the parking payment console 200 to the server 125 for generating or updating the database 123 and/or the lookup table that lists locations of parking payment consoles. Alternatively, the location is provided by configuration during installation.

Figure 3:
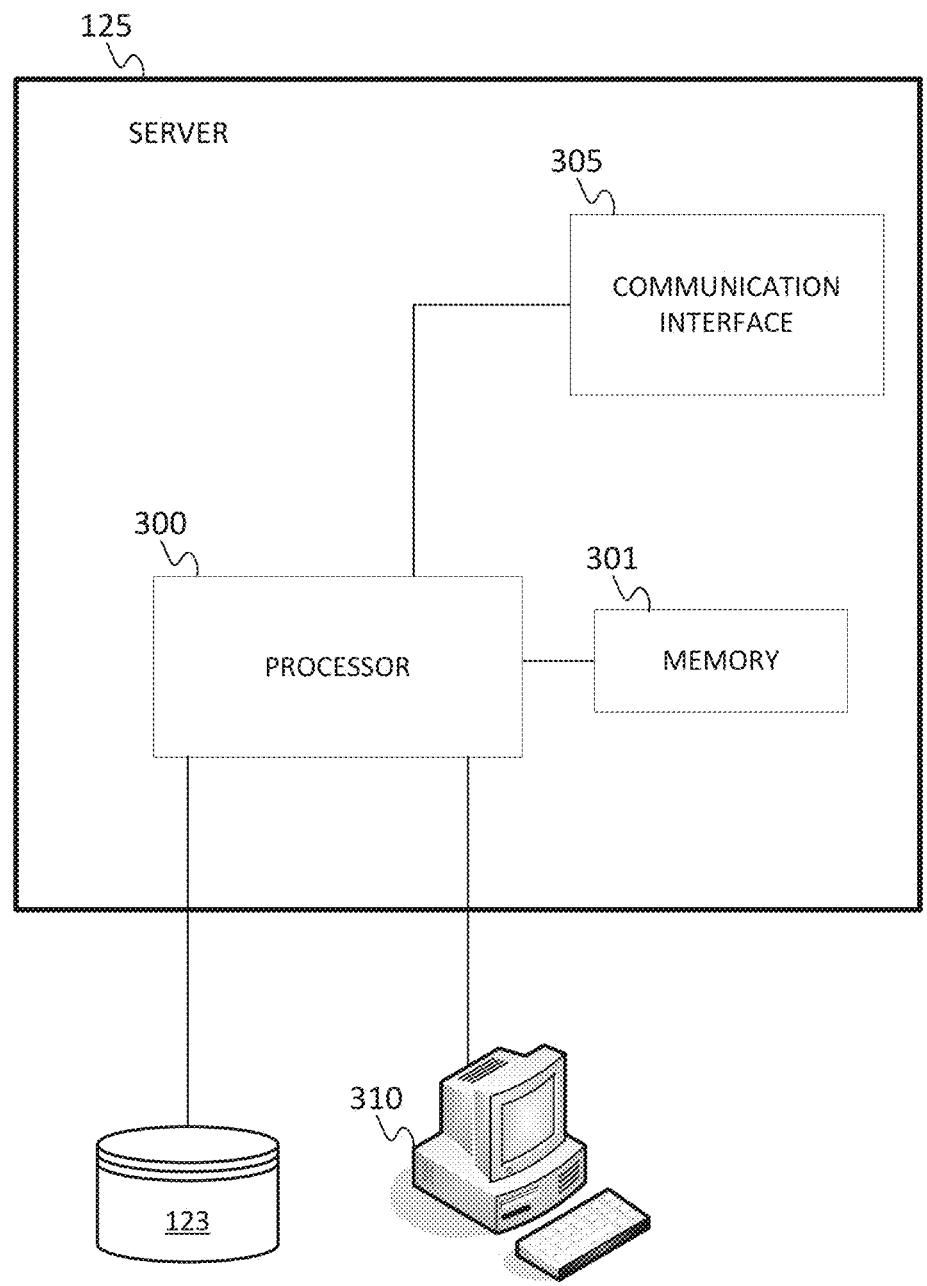
FIG. 3 illustrates an exemplary server of the system of FIG. 1.

FIG. 3 illustrates an exemplary server of the system of FIG. 1. The computing resources may be divided between the server 125 and the mobile device 122. In some embodiments, the server 125 performs a majority of the processing. In other embodiments, the mobile device 122 and/or the workstation 128 performs a majority of the processing.

The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122.

The processor 300, which may be any type of controller, is configured to analyze the sensor data collected by the mobile device 122. The sensor data may be analyzed to identify when the mobile device 122 is in an automobile that has parked, as described above. The sensor data may be analyzed to identify when the mobile device 122 is carried by a user that has paid for parking. In addition or as an alternative to the location of the mobile device 122, the processor 300 may use rotational data, acceleration data, or sound data from the mobile device 122.

Figure 4:
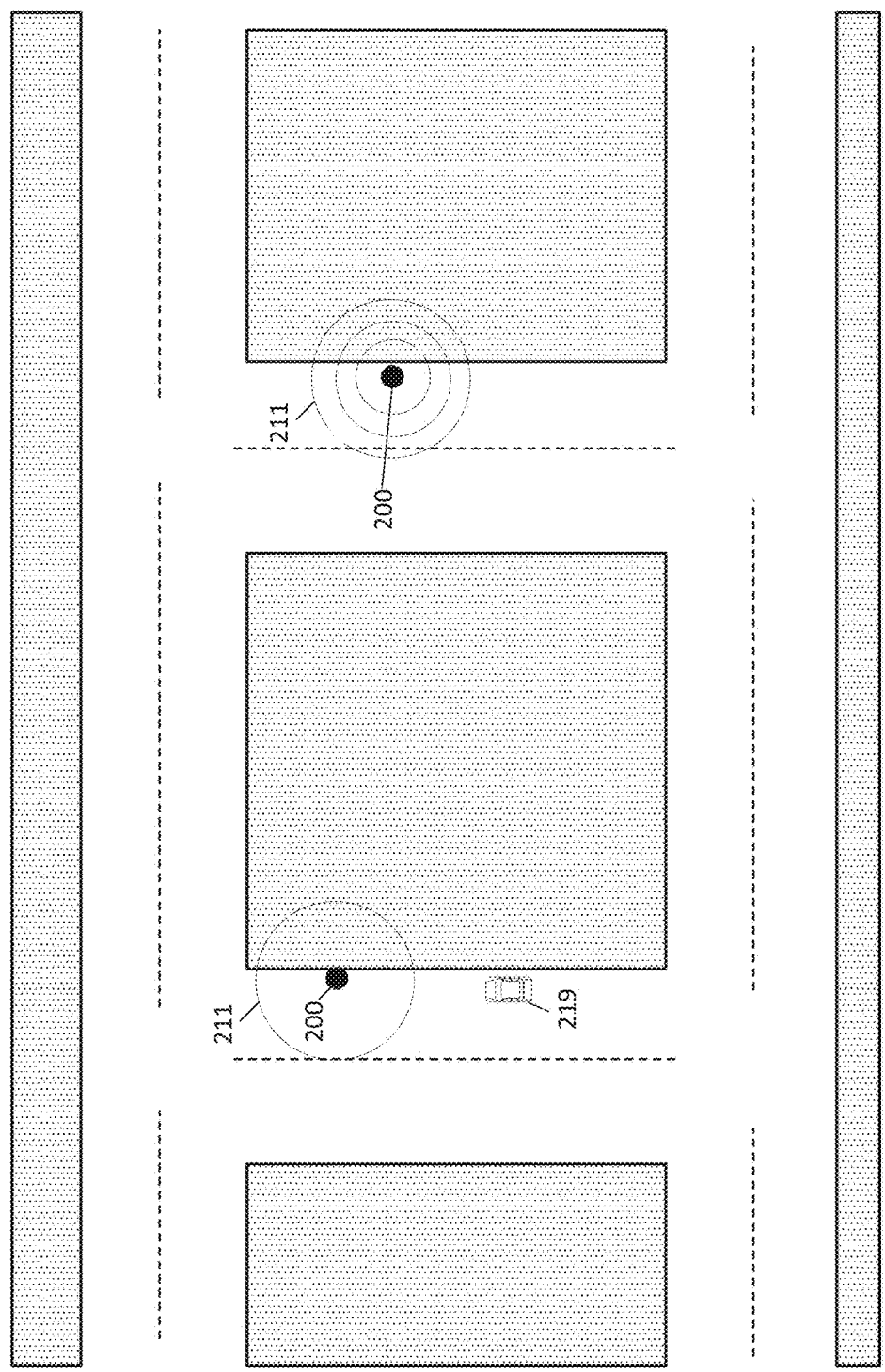
FIG. 4 illustrates an example geographic layout for the example parking payment console.

FIG. 4 illustrates an example geographic layout for the parking payment console 200. The layout may be stored by the database 123 along with other map data. The geographic layout may include multiple parking payment consoles, which may be associated with one or more bands 211 around each parking payment console 200. A car 219 may be parked inside of or outside of the one or more bands 211.

The band 211 for a parking payment console 200 may be defined using geographic coordinates that define three or more vertices of a polygon. Alternatively, the band 211 may be defined as a predetermined distance from the parking payment console 200. Example distances includes 1 meter, 5 meter, and 10 meters. The predetermined distance may be a radius of a circle for the band 211, as shown by FIG. 4. The predetermined distance may be a perpendicular distance to a side of a square or a rectangle. Other band designations may be used, such as an area of any shape.

The one or more bands 211 may include multiple levels of banding around the parking payment console 200. There may be up to K bands, each with a different size. The size of the bands may be proportionally spaced. The size of the bands may be logarithmically spaced such that each band is sized at a predetermined ratio to the preceding band. The bands may be spaced in another pattern.

The sizes of the one or more bands 211 are configured by the user. For example, the sizes may be entered into workstation 310. In another example, the processor 300 calculates the size of the one or more bands 211. The size of the bands may be calculated based on the geographic position of the parking payment console 200. The accuracy of the location data for the mobile device 122 may be a function of geographic position due to accuracy problems faced by GPS in urban environments. The accuracy of GPS may be a function of line of sight, sizes of adjacent buildings, likelihood of multipath, or other factors. Thus, the processor 300 may calculate the size for the one or more bands 211 depending on whether the location of the parking payment console 200, or the location of the mobile device 122 when the sensor data was collected, is designated as an urban area.

The accuracy of the location data may also be a function of the type of mobile device 122. Accordingly, the processor 300 may be configured to calculate the size of the one or more bands 211 based on the model, the device type, or the signal type of the mobile device 122. Data indicative of the model, the device type, or the signal type may be included in the sensor data. Example models from various manufacturers may be able to provide different levels of accuracy for location data. Example device types include smartphone, personal navigation device, and laptop. Example signal types include GPS, GLONASS, and a combination of GPS and GLONASS.

The processor 300 may be configured to compare a location of the mobile device 122 to the locations of the bands 211. In one example, a score is assigned to the sensor data based on the number of bands 211 and/or the amount of time spent in each band. The score may be increased if the sensor data indicates that the mobile device 122 has traveled through successive bands in the direction of the parking payment console 200.

Figure 5:
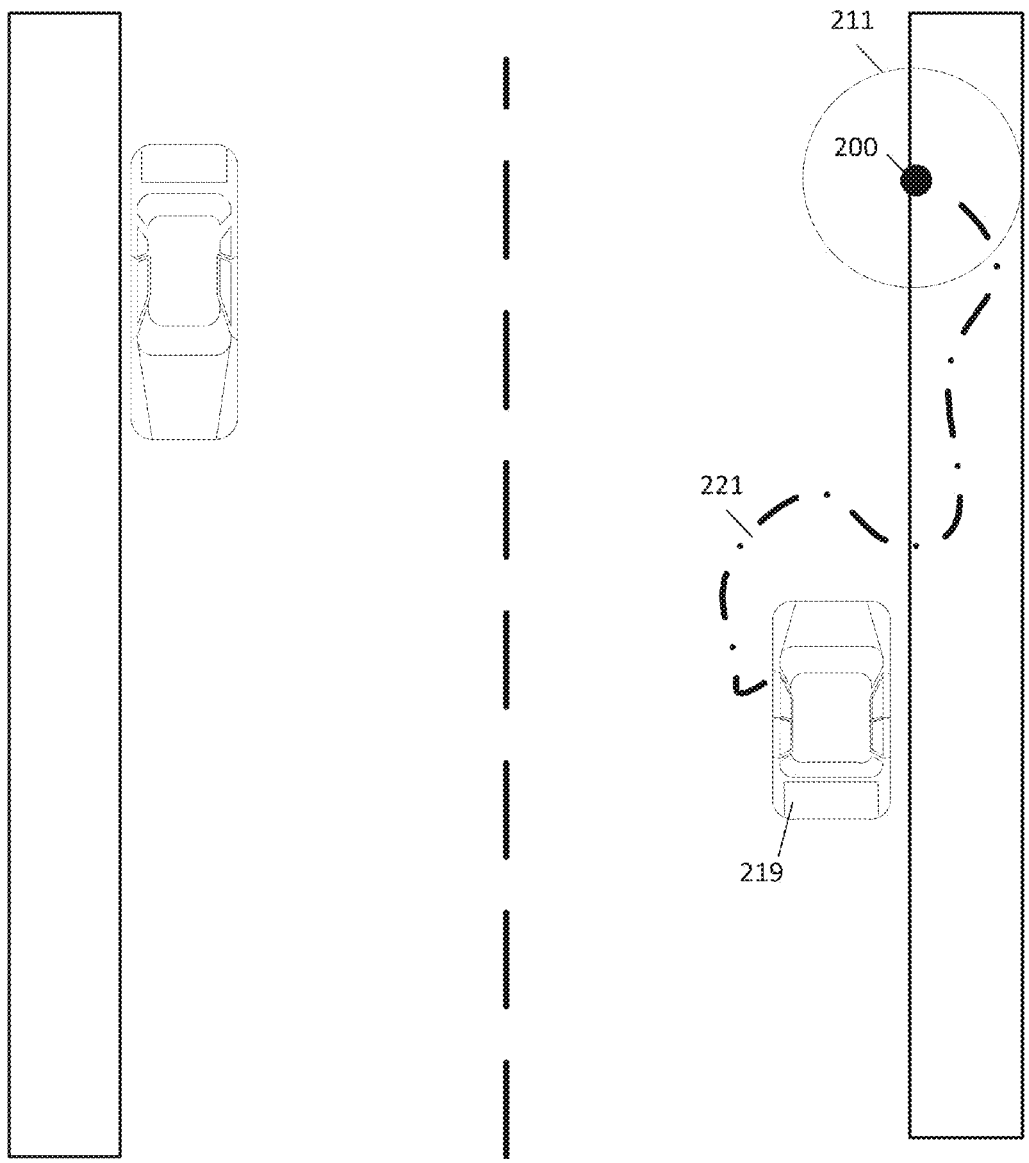
FIG. 5 illustrates an example customer path to an example parking payment console.
Figure 6:
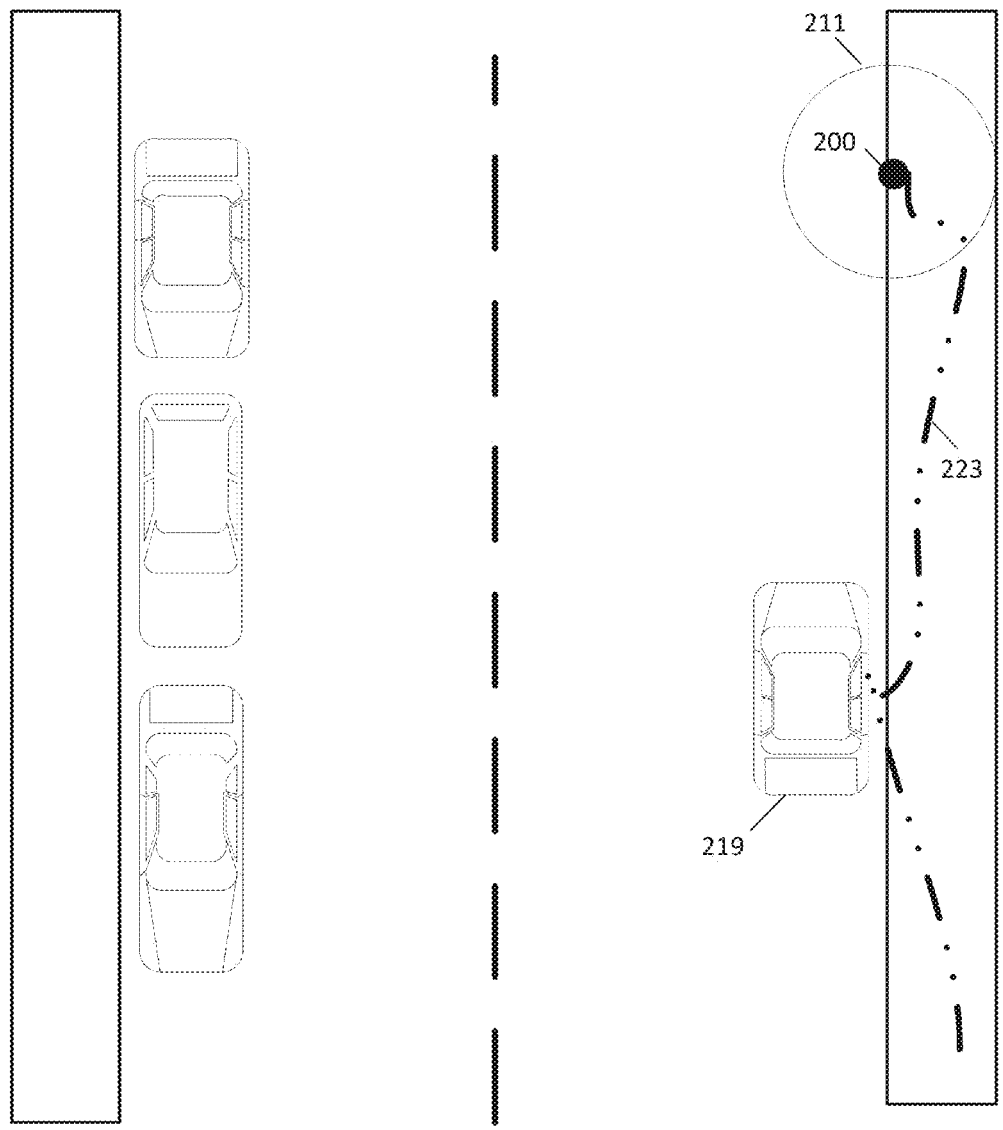
FIG. 6 illustrates an example customer return path from an example parking payment console.

FIG. 5 illustrates an example customer path 221 to the parking payment console 200, and FIG. 6 illustrates an example customer return path 223 from the parking payment console 200 to the automobile 219. The score for the location of the mobile device 122 may be combined with one or more other scores based on the rotational data, the acceleration data, or the sound data from the mobile device 122.

The rotational data of the mobile device 122 may be rotational position data (e.g., orientation), rotational speed data, or rotational acceleration data. The rotational data may be generated by a gyrometer, a compass, or a magnetic sensor. The rotational data may be compared to expected payment motions of the user, who may be referred to as a traveler. One example payment motion include the movements associated with making a payment at the parking payment console 200. When making a payment, the traveler comes in close vicinity to the parking meter. Closeness to the parking meter can be ascertained by observing the GPS location and the parking meter location and take a distance measure between the two locations. The traveler then spends a few seconds been relatively stationary at the parking meter while making payment, the duration spent may depend on the type of payment that the traveler considers (i.e. cash, coins, or card).

Another example payment motion includes the movements associated with turning to locate and identify the parking payment console 200. One example payment motion includes the movements associated with placing the parking payment receipt in the window or dash of the automobile. Thus, the pay status of the parking spot describes whether a receipt for the parking spot has been placed in the automobile.

The processor 300 is configured to identify a rotation of the mobile device 122 from the gyrometer data or the compass data and compare the rotation to possible payment motions. When the rotation of the mobile device 122 matches one of the possible payment motions, the processor 300 determines that payment has been made. Multiple matches of different motions may be required. In response to the lack of one or a set number of possible payment motions, the processor 300 may determine that no payment has been made and generate an alert message.

Alternatively, the processor 300 may calculate a score from the comparison of the rotation of the mobile device 122 to the possible payment motions. The degree of the match to the possible payment motion is proportional to the score. The score for the location of the mobile device 122 may be added to or averaged with the score from the rotation data.

The acceleration data may describe the velocity or acceleration of the mobile device 122. The processor 300 may analyze the acceleration data to determine when the mobile device stops or slows near the parking payment console 200. The processor 300 is configured to calculate a score as function of the time spent below a threshold acceleration near the parking payment console 200. Example threshold accelerations may be 0.01, 0.1, or 0.2 meters per second per second. When the acceleration data is below the acceleration threshold, the processor 300 increments a counter.

The processor 300 is configured to calculate an acceleration score based on the elapsed time of the counter. The acceleration score may be proportional to the elapsed time of the counter. The score for the location of the mobile device 122 may be added to or averaged with the score from the acceleration data.

The audio data may be collected by a microphone on the mobile device 122. The audio data may include incidental sounds produced by the parking payment console 200 as indicative of payment being made. The incidental sounds may include the sounds inserting coins or cash into the parking payment console 200. The incidental sounds may include sounds of the payment receipt printing. Alternatively or in addition, the audio data may include one or more tones generated by a controller in the parking payment console 200 and converted to sound waves by a microphone. The tones may be touch tones or another sound of a predetermined frequency and/or length that indicates that payment was made. The tones may be dual-tone multi-frequency signaling (DTMF). Example frequencies may be in the range of 200 hertz to 2 kilohertz (e.g., 440 Hz, 770 Hz, 852 Hz 1200 Hz, and 1633 Hz). Example durations for the tones include 50 milliseconds, 100 milliseconds, 1 second, or 2 seconds. The tones may be function of the amount of payment, the duration of parking, and/or any of the parameters above.

The processor 300 is configured to analyze the tones to identify whether the user associated with the mobile device 122 has paid for parking. For example, the processor 300 may compare the audio data to a set of expected payment console sounds. When a match is identified, the processor 300 updates the pay status as paid. In response to the lack of the pay status as paid, the processor 300 may determine that no payment has been made and generate an alert message.

Alternatively, the processor 300 may calculate a score from the comparison of the audio data collected by the mobile device 122 to the set of expected payment console sounds. The degree of the match to the set of expected payment console sounds is proportional to the score. The score for the location of the mobile device 122 may be added to or averaged with the score from the audio data.

The scores of the various types of sensor data may be weighted. For example, the scores may be combined into a feature vector with each sensor providing a component of the vector. The feature vector may be normalized. Each component of the vector may be associated with a weight. The products of the components and the weights are multiplied to calculate scaled values for each component so that the magnitude of the feature factor is one.

In one example, the scoring system for the sensors can be weighted according to sensor importance and contribution to parking payment detection. Thus, each sensor reading is classified separately and the final classification output is weighted. One example includes four sensors: (1) microphone, (2) GPS, (3) accelerometer, and (4) gyrometer. Each sensor reading is classified separately for parking payment detection. The probability of parking payment detection is determined by the classifier for the microphone is 0.67, for the GPS is 0.78, for the accelerometer 0.12, and for the gyro 0.86. The relative importance of the sensors to parking payment detection may be weighted out of 100% as 30% for microphone, 25% for GPS, 25% for accelerometer, and 20% for gyrometer. The final probability of parking payment detection for the traveler/driver is (30/100)*0.67+(25/100)*0.78+(25/100)*0.12+(20/100)*0.86=0.597.

The feature vector may be compared to one or more classification vectors by the processor 300. The classification vectors may describe predetermined scenarios (e.g., combinations of sensor data) for the pay status that indicates that payment has been made. The feature vector consists of information from all the sensors and represents two activities (making payment for parking, not making payment for parking). Generic representations of feature vectors may include: [M1, M2 ... Mn, M3, G1, G2, G3, G4, ... Gn, A1, A2, ... An, Gy1, Gy2, ... Gyn, PARKING PAYMENT] and M1, M2 ... Mn, M3, G1, G2, G3, G4, ... Gn, A1, A2, ... An, Gy1, Gy2, ... Gyn, NO PARKING PAYMENT]. The terms M1, M2, ... Mn indicate the feature values that are related to the microphone sensors that are considered for payment detection. This may include information on pitch and frequency. Likewise the terms G1, G2, G3, G4, ... Gn indicates the features that are related to GPS such as closeness to the parking meter as distance, stop rate, GPS accuracy, or other parameters. Further, the terms A1, A2, ..., An represent the features related to the accelerometer such as current acceleration in all three axes, signal magnitude area, ratio between acceleration in the different axes. Similarly the gyro features such as angles of rotation, speed of rotation are captured. Finally, one or more feature vector readings that correspond to the two states (1) parking payment or (2) no parking payment. A machine learning model may then be trained for recognizing these patterns of payment of not. When new unlabeled information is received, the machine learning algorithm may make a prediction based on the training examples.

The processor 300 may also be configured to determine expected hours that payment is required at the parking payment console 200. The server 125 may be in communication with many mobile devices (e.g., all mobile devices associated with one or more service providers). Over time, the processor 300 logs the movement of various mobile devices and determines when a user associated with a mobile device has likely made a parking payment. Any combination of the above methods to identify pay status may be used. Based on the logs, the processor 300 generates a schedule for when payment is required at the parking payment console 200. An example schedule may be 9 AM to 7 PM Mondays through Fridays. The processor 300 may access the schedule to determine whether to send an alert to subsequent mobile devices that have likely not paid for parking. That is, the processor 300 generates an alert in response to a pay status that a user has likely not paid and data that describes a schedule indicating that payment is currently required.

Figure 7:
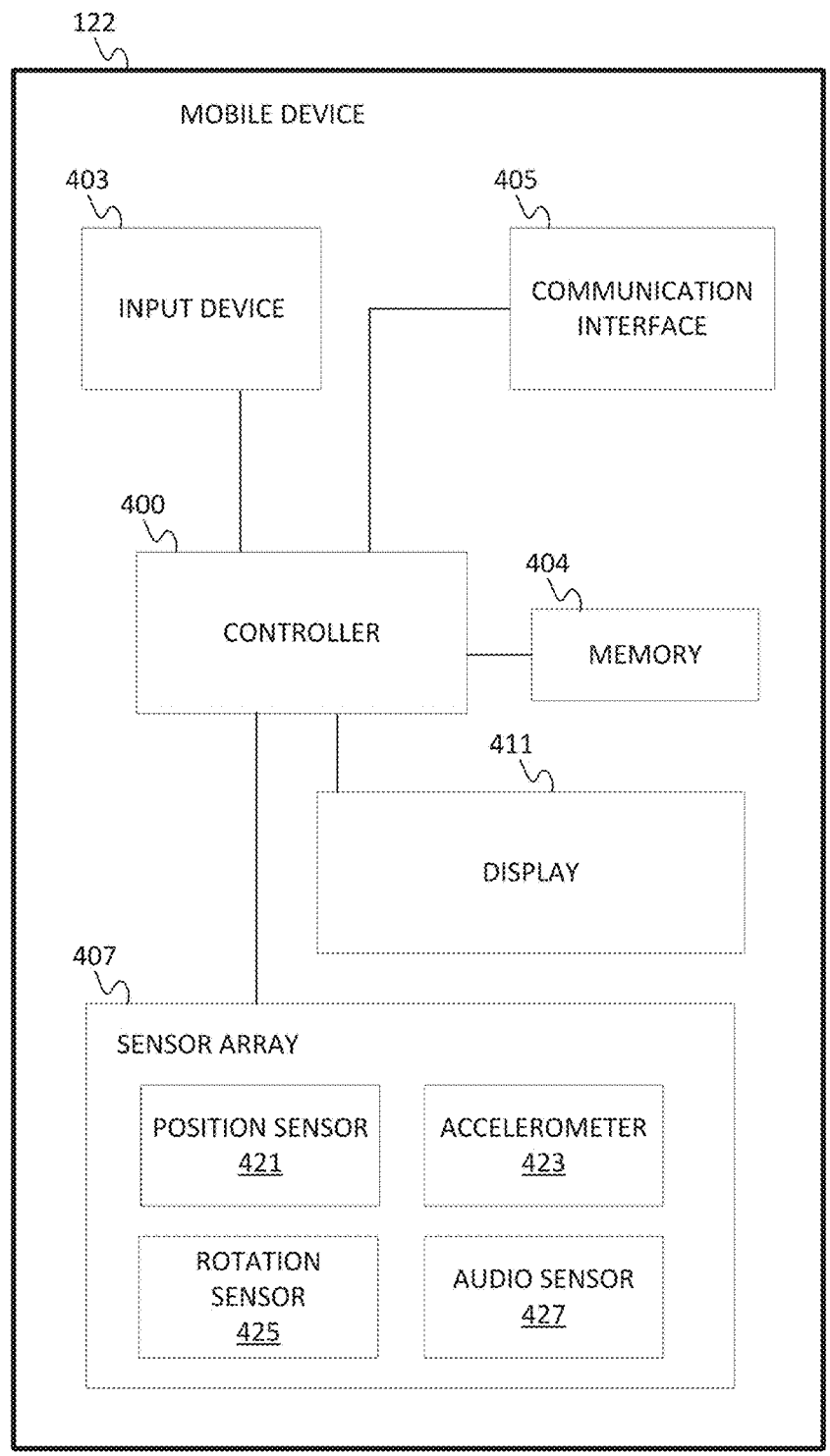
FIG. 7 illustrates an exemplary mobile device of the system of FIG. 1.

FIG. 7 illustrates an exemplary mobile device of the system of FIG. 1. The mobile device 122 may be referred to as a navigation device. The mobile device 122 includes a controller 400, a memory 404, an input device 403, a communication interface 405, a sensor array 407, and a display 411.

The sensor array 407 includes a position sensor 421, an accelerometer 423, a rotation sensor 425, and an audio sensor 427. The positioning sensor 421 may include a GPS, GLONASS, or a cellular or similar position sensor for providing location data. The position sensor 421 may utilize GPS-type technology, a dead reckoning-type system, cellular location, or combinations of these or other systems. The position sensor 421 may also include a receiver and correlation chip to obtain a GPS signal. The accelerometer 423 may be single-axis or multi-axis.

The accelerometer outputs acceleration data that describes acceleration or may be manipulated to describe velocity of the mobile device 122. The accelerometer may include a damped mass coupled to a spring. In response to an acceleration force placed on the accelerometer, the mass is displaced so that the spring accelerates the mass at the same rate as the casing. The physical displacement is measured to generate the acceleration data. The accelerometer may be a piezoelectric device, a piezoresistive device, or a capacitive device to convert the mechanical motion into an electrical signal. The accelerometer may be a micro electro-mechanical system (MEMS) and may include a cantilever beam with a seismic mass in gas sealed in the device.

The rotation sensor 425 may be a gyrometer, a compass, or a magnetic sensor. The rotation sensor 425 is configured to generate orientation data or rotational data indicative of the relative orientation of the mobile device 122. The sensor array 407 may be an inertial measurement unit (IMU) including any integrated combination of accelerometers, gyroscopes, and magnetometers. Other motions sensors may be used.

The controller 400 may be configured to identify a parking event that describes that a vehicle has parked. The mobile device 122 is transported by the vehicle. In one example, the parking of the vehicle is determined based on the location and speed of the mobile device 122. For example, when the mobile device 122 enters the known location of the parking spot, the controller 400 determines that the vehicle has parked. Alternatively, when the mobile device 122 travels at a typical driving speed (e.g., 20 mph to 80 mph) then travels at a typical walking speed (e.g., 1 mph 10 mph), the controller 400 determines that the vehicle has parked. The controller 400 may also determine that the vehicle has parked when the mobile device 122 travels at the typical driving speed, stops moving for a predetermined time, and travels at the typical walking speed.

In another example, the controller 400 may identify a parking pattern of movement. For example, a parallel parking sequence may include several steps. First, the automobile stops ahead of the parking spot in the direction of travel. Second, the automobile moves at an angle into the parking spot. The angle may be 20 to 45 degrees. The automobile turns in the opposite position to straighten in the parking spot.

In another example, the controller 400 may identify that a vehicle has parked based on a connection between the mobile device 122 and the vehicle. For example, the mobile device may be connected to a wireless network (e.g., 802.11, Bluetooth, or another format) of the vehicle. When the mobile device 122 disconnects from the wireless network, the controller 400 determines that the vehicle has parked. The controller may also track the position of the mobile device 122 in combination with the disconnection of the mobile device 122 to determine that the vehicle has parked. Alternatively, the analysis to determine parking event may be performed by the server 125.

Figure 8:
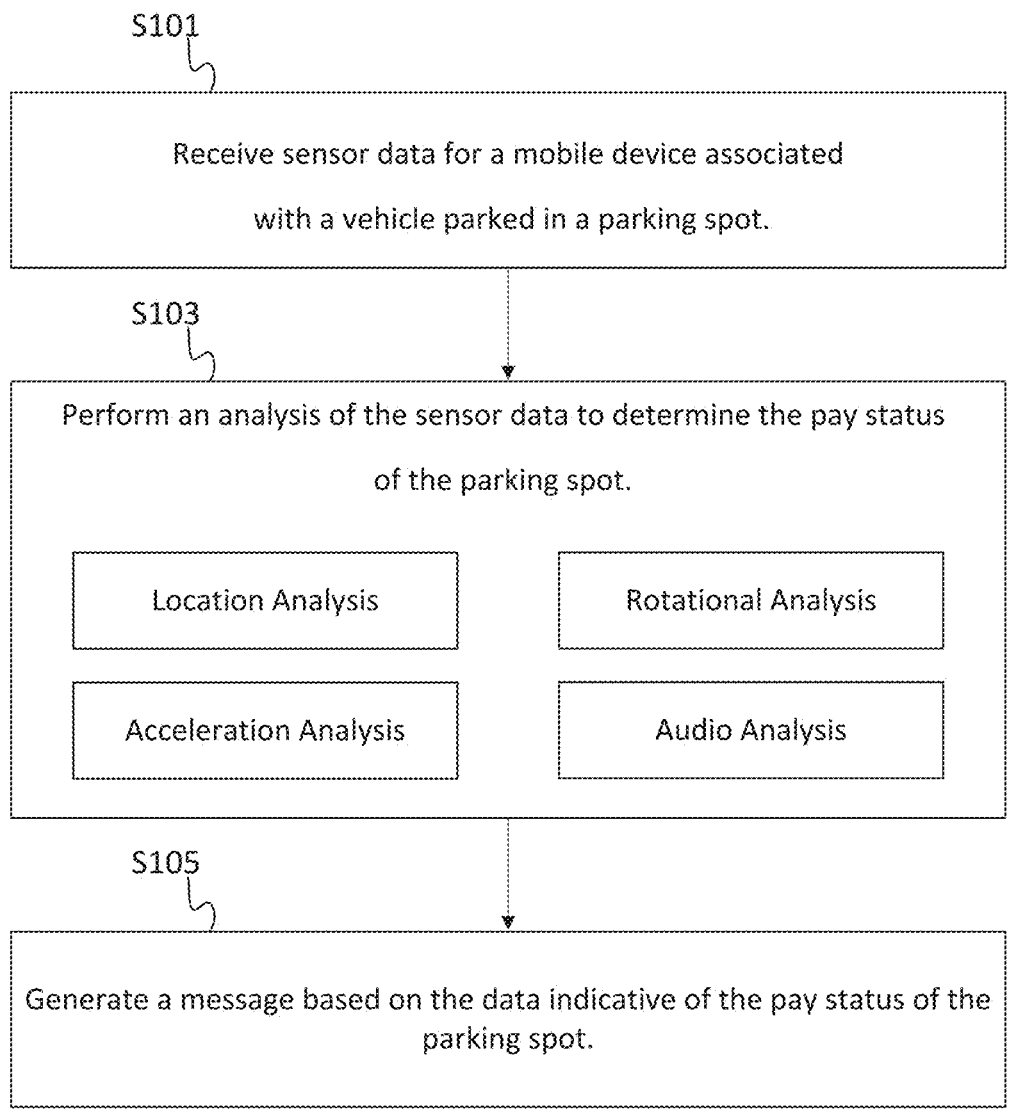
FIG. 8 illustrates another example flowchart for parking payment detection.

FIG. 8 illustrates an example flowchart for parking payment detection, which is described in relation to the mobile device 122 but may be performed by another device. The mobile device 122 may include a mobile application for performing the parking payment detection and/or parking event detection. Additional, different, or fewer acts may be provided.

At act S101, the controller 400 is configured to receive sensor data for the mobile device 122. The mobile device 122 is associated with a vehicle parked in a parking spot. A mobile device 122 associated with the vehicle parked in the parking spot means that the mobile device 122 has identified itself as being parked or that data collected by the mobile device 122 has been used to conclude that a parking event has likely occurred.

At act S103, the controller 400 is configured to perform an analysis of the sensor data to determine the pay status of the parking spot. The analysis may include any combination of an analysis of the location of the mobile device 122, an analysis of the acceleration of the mobile device 122, an analysis of the rotational movement of the mobile device 212, and an analysis of the audio data collected of the mobile device 122. The mobile application on the mobile device 122 may be configured to activate the various sensors (e.g., turn on the microphone when the mobile device 122 approaches a payment parking console 200).

At act S105, the controller 400 is configured to generate a message based on the data indicative of the pay status of the parking spot. The controller 400 may also check the schedule for the parking spot before generating the message. If no payment is required at the current time, the message is not generated. Alternatively, the processor 300 of the server 125 performs one or more of acts S101-S105.

The message may be configured to alert a user associated with the mobile device that payment was omitted. The message may give the user the option of paying for parking through the mobile application. That is, the user may enter banking information, credit card information, or an online payment service to pay for the parking. The payment may be associated with the identification value of the parking spot or the identification of the payment parking console 200. In one example, the mobile application accesses the license plate number or description of the vehicle from 404 or from data entered in input device 403. The license plate number or description of the vehicle is sent to the administrator 121. When a field agent attempts to issue a ticket to the vehicle, the administrator 121 identifies that the vehicle has paid for parking and prevents the ticket from being issued.

In another example, the mobile application is controlled by a third party. The message may be configured to alert a user associated with the mobile device that payment was omitted and also offer to travel to the parking spot to pay for parking on behalf of the user. Alternatively, the mobile application may prompt the user to make a service fee payment to the third party to prevent the third party from notifying the parking authority. The message may give the user the option of paying for the service fee payment through the mobile application. That is, the user may enter banking information, credit card information, or an online payment service to pay for the service fee payment.

The input device 403 may be one or more buttons, keypad, keyboard, mouse, stylist pen, trackball, rocker switch, touch pad, voice recognition circuit, or other device or component for inputting data to the mobile device 122. The input device 403 and the display 411 may be combined as a touch screen, which may be capacitive or resistive. The display 411 may be a liquid crystal display (LCD) panel, light emitting diode (LED) screen, thin film transistor screen, or another type of display.

The controller 400 and/or processor 300 may include a general processor, digital signal processor, an application specific integrated circuit (ASIC), field programmable gate array (FPGA), analog circuit, digital circuit, combinations thereof, or other now known or later developed processor. The controller 400 and/or processor 300 may be a single device or combinations of devices, such as associated with a network, distributed processing, or cloud computing.

The memory 404 and/or memory 301 may be a volatile memory or a non-volatile memory. The memory 404 and/or memory 301 may include one or more of a read only memory (ROM), random access memory (RAM), a flash memory, an electronic erasable program read only memory (EEPROM), or other type of memory. The memory 404 and/or memory 301 may be removable from the mobile device 100, such as a secure digital (SD) memory card.

The communication interface 405 and/or communication interface 305 may include any operable connection. An operable connection may be one in which signals, physical communications, and/or logical communications may be sent and/or received. An operable connection may include a physical interface, an electrical interface, and/or a data interface. The communication interface 405 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

In addition to the locations and related information of parking payment consoles, the database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments 104), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections 106) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The memory 404 and/or memory 301 may be a non-transitory computer-readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
receiving sensor data for a mobile device, wherein the sensor data describes an action of an automobile or actions of a person associated with the automobile;
performing a first analysis of a first portion of the sensor data to determine that the automobile has stopped at a parking spot associated with a payment console;
performing a second analysis of a second portion of the sensor data to determine data of relative movement between the mobile device and the payment console, the data of relative movement indicative of a pay status for the payment console and the automobile in the parking spot, wherein the pay status is indicative of whether a payment has been paid for the parking spot, wherein relative movement of the mobile device to within a predefined distance of the payment console and acceleration data from an accelerometer sensor of the mobile device below a threshold value indicate that a payment has been paid for parking, and wherein relative movement of the mobile device that does not come within the predefined distance of the payment console or acceleration data from the accelerometer above a threshold value indicates that a payment has not been paid for parking; and generating a message based on the data indicative of the pay status of the parking spot, when the pay status indicates that payment has not been made for the parking spot.

2. The method of claim 1, wherein the pay status of the parking spot describes whether a fee for the parking spot has been paid.

3. The method of claim 1, wherein the pay status of the parking spot describes whether a receipt for the parking spot has been placed in the automobile.

4. The method of claim 1, wherein the pay status of the parking spot describes whether a fee is required for the parking spot.

5. The method of claim 1, wherein the sensor data includes location data for the mobile device.

6. The method of claim 5, wherein the second analysis includes tracing the sensor data through a series of bands spaced concentrically from the payment console.

7. The method of claim 5, wherein performing the second analysis comprises:
accessing at least one location for the payment console; and
comparing the location data for the mobile device to a location of the payment console.

8. The method of claim 1, wherein performing the second analysis comprises:
identifying that the mobile device has stopped near the payment console based on the acceleration data.

9. The method of claim 1, wherein the sensor data includes gyrometer data or compass data and performing the second analysis comprises:
identifying a rotation of the mobile device from the gyrometer data or the compass data.

10. The method of claim 1, wherein the sensor data includes audio data and performing the second analysis comprises:
comparing the audio data to an expected payment console sound of the payment console.

11. An apparatus comprising:
a sensor array configured to generate sensor data, wherein the sensor array includes a position sensor and an accelerometer;
a memory configured to store the sensor data associated with a mobile device, the sensor data describing movement of an automobile or a person associated with the automobile; and
a controller configured to analyze a first portion of the sensor data to determine that the automobile has stopped at a parking spot, the controller further configured to determine a pay status of the parking spot with respect to the automobile based on a second portion of the sensor data including data for relative motion of the mobile device and a payment console, the pay status indicative of whether payment has been paid for the parking spot, wherein relative movement of the mobile device to within a predefined distance of the payment console and acceleration data from the accelerometer below a threshold value indicate that a payment has been paid for parking, and wherein relative movement of the mobile device that does not come within the predefined distance of the payment console or acceleration data from the accelerometer above a threshold value indicates that a payment has not been paid for parking, the controller configured to generate a message based on the pay status of the parking spot when the pay status indicates that payment has not been made for the parking spot.

12. The apparatus of claim 11, further comprising:
a sensor array configured to generate the sensor data, wherein the sensor array includes a position sensor.

13. The apparatus of claim 12, wherein the sensor array further includes a microphone or a gyroscope.

14. A non-transitory computer readable medium including instructions that when executed by a processor, instruct the processor to:
receive sensor data for a mobile device including acceleration data from an accelerometer, wherein the mobile device is associated with a vehicle parked in a parking spot;
perform a first analysis of a first portion of the sensor data to determine that the vehicle has parked in the parking spot associated with a payment console;
perform an analysis of a second portion of the sensor data to determine relative movement between the mobile device and the payment console, the relative movement indicative of a pay status of the payment console with the parking spot, wherein the pay status is indicative of whether a payment has been paid for the parking spot, wherein relative movement of the mobile device to within a predefined distance of the payment console and acceleration data from the accelerometer device below a threshold value indicate that a payment has been paid for parking, and wherein relative movement of the mobile device that does not come within the predefined distance of the payment console or acceleration data from the accelerometer above a threshold value indicates that a payment has not been paid for parking; and
generate a message based on the pay status of the parking spot.

15. The non-transitory computer readable medium of claim 14, wherein the sensor data includes location data for the mobile device and the analysis compares the location data for the mobile device to a geographic location of the payment console for the parking spot.

16. The non-transitory computer readable medium of claim 14, wherein the sensor data includes rotational data for the mobile device and the analysis compares the rotation data for the mobile device to a movement pattern associated with making payment for the parking spot.

17. The non-transitory computer readable medium of claim 14, wherein the message based on the pay status of the parking spot is configured to alert a user associated with the mobile device that payment was omitted.

18. The method of claim 1, wherein the relative movement of the mobile device indicating that payment has been paid for parking comprises relative movement of the mobile device within the predefined distance of the payment console for a predetermined amount of time, and wherein relative movement of the mobile device indicating that payment has not been paid for parking comprises relative movement of the mobile device that is not within the predefined distance of the payment console for the predetermined amount of time.

* * * * *